(12) United States Patent
Salmre

(10) Patent No.: US 7,634,354 B2
(45) Date of Patent: Dec. 15, 2009

(54) LOCATION SIGNPOSTING AND ORIENTATION

(75) Inventor: Ivo William Salmre, Aachen (DE)

(73) Assignee: Microsoft Corporation, Redmond, WA (US)

( * ) Notice: Subject to any disclaimer, the term of this patent is extended or adjusted under 35 U.S.C. 154(b) by 563 days.

(21) Appl. No.: 11/217,638

(22) Filed: Aug. 31, 2005

(65) Prior Publication Data

US 2007/0050129 A1 Mar. 1, 2007

(51) Int. Cl.
*G01C 21/00* (2006.01)
(52) U.S. Cl. .................. 701/207; 701/213; 73/178; 345/440; 340/995.1
(58) Field of Classification Search ......... 701/200–213, 701/300; 369/13.01, 14, 93; 345/440; 342/457; 73/178; 340/990, 995.1; 709/246
See application file for complete search history.

(56) References Cited

U.S. PATENT DOCUMENTS

| | | | | |
|---|---|---|---|---|
| 4,937,570 | A * | 6/1990 | Matsukawa et al. | 340/905 |
| 5,631,642 | A * | 5/1997 | Brockelsby et al. | 340/993 |
| 5,774,829 | A * | 6/1998 | Cisneros et al. | 701/213 |
| 6,233,523 | B1 | 5/2001 | Sood | 701/213 |
| 6,252,544 | B1 * | 6/2001 | Hoffberg | 342/357.1 |
| 6,321,158 | B1 * | 11/2001 | DeLorme et al. | 701/201 |
| 6,429,812 | B1 * | 8/2002 | Hoffberg | 342/357.1 |
| 6,442,483 | B1 * | 8/2002 | Doglione | 701/300 |
| 6,615,134 | B2 * | 9/2003 | Ando | 701/209 |
| 6,697,734 | B1 | 2/2004 | Suomela | 701/212 |
| 6,710,774 | B1 * | 3/2004 | Kawasaki et al. | 345/419 |
| 6,857,016 | B1 | 2/2005 | Motoyama et al. | 709/224 |
| 6,879,909 | B2 | 4/2005 | Hirano et al. | 701/208 |
| 6,944,679 | B2 * | 9/2005 | Parupudi et al. | 709/246 |
| 7,519,470 | B2 * | 4/2009 | Brasche et al. | 701/207 |
| 2002/0049533 | A1 | 4/2002 | Kusano et al. | |

(Continued)

FOREIGN PATENT DOCUMENTS

AU 2007231862 A1 * 5/2008

(Continued)

OTHER PUBLICATIONS

Sighted automation and fine resolution imaging; Brown, W.M.; Walker, J.L.; Boario, W.R.; Aerospace and Electronic Systems, IEEE Transactions on; vol. 40, Issue 4, Oct. 2004 pp. 1426-1445, Digital Object Identifier 10.1109/TAES.2004.1386898.*

(Continued)

*Primary Examiner*—Cuong H Nguyen
(74) *Attorney, Agent, or Firm*—Woodcock Washburn LLP

(57) ABSTRACT

A signposting and orientation technology is presented. This technology employs signposts superimposed on map images in order to convey otherwise undisplayable information on a map image. With signposting, zoomed-in maps can convey relationships between items on the map image, even though some of those item are not directly displayed on the map images. For example, a signpost can convey the distance between an anchoring object of reference and an item that is some distance and direction away from the object. Any relationships between objects and/or items can be dynamically maintained even though both the objects and item are moving about a map image. Additionally, orientation marks can be used in conjunction with signposts to orient users of the technology. Orientation marks may employ directional vectors, beginning at with the object of reference and ending with the orientation mark, whether the mark is celestial in nature or otherwise.

16 Claims, 14 Drawing Sheets

U.S. PATENT DOCUMENTS

| | | | |
|---|---|---|---|
| 2002/0118118 A1 | 8/2002 | Myllymaki et al. | |
| 2003/0184654 A1 | 10/2003 | Kinjo | 348/207.1 |
| 2004/0008138 A1 | 1/2004 | Hockley, Jr. et al. | 342/357.09 |
| 2004/0073356 A1 | 4/2004 | Craine | |
| 2004/0073361 A1 | 4/2004 | Tzamaloukas et al. | 701/210 |
| 2004/0153238 A1* | 8/2004 | Miyahara | 701/207 |
| 2004/0204063 A1 | 10/2004 | Van Erlach | 455/556.1 |
| 2004/0220726 A1* | 11/2004 | Jin et al. | 701/207 |
| 2004/0243307 A1* | 12/2004 | Geelen | 701/213 |
| 2004/0255718 A1 | 12/2004 | Steers | 74/572 |
| 2005/0149251 A1* | 7/2005 | Donath et al. | 701/200 |
| 2006/0064243 A1* | 3/2006 | Hirose | 701/211 |
| 2006/0287819 A1* | 12/2006 | Brulle-Drews et al. | 701/211 |
| 2007/0027628 A1* | 2/2007 | Geelen | 701/213 |
| 2007/0050129 A1* | 3/2007 | Salmre | 701/207 |
| 2007/0185651 A1* | 8/2007 | Motoyama et al. | 701/211 |
| 2007/0203641 A1* | 8/2007 | Diaz et al. | 701/208 |
| 2007/0203643 A1* | 8/2007 | Ramaswamy et al. | 701/211 |
| 2007/0203646 A1* | 8/2007 | Diaz et al. | 701/213 |
| 2007/0233367 A1* | 10/2007 | Chen et al. | 701/207 |

FOREIGN PATENT DOCUMENTS

| | | | |
|---|---|---|---|
| CN | 201000710 Y | * | 1/2008 |
| DE | 3512000 A | * | 10/1986 |
| EP | 1318379 A1 | * | 6/2003 |
| EP | 1435 600 B1 | | 7/2004 |
| FR | 2343300 A | * | 11/1977 |
| GB | 2 374 763 A | | 10/2002 |
| JP | 63222215 A | * | 9/1988 |
| JP | 04366991 A | * | 12/1992 |
| JP | 06118870 A | * | 4/1994 |
| JP | 08211830 A | * | 8/1996 |
| JP | 2004310717 A | * | 11/2004 |
| WO | WO 0049530 | | 8/2000 |
| WO | WO 01/32480 A1 | | 5/2001 |
| WO | WO 2007027374 A2 | * | 3/2007 |
| WO | WO 2008/019879 A2 | * | 2/2008 |

OTHER PUBLICATIONS

Low Cost and Low Weight Technologies for Planetary Surface Exploration; Innocenti, M.; Pollini, L.; Recent Advances in Space Technologies, 2007. RAST '07. 3rd International Conference on; Jun. 14-16, 2007 pp. 562-567; Digital Object Identifier 10.1109/RAST.2007.4284056.*

Avoiding Static and Dynamic Objects in Navigation; Han Li; Yili Fu; He Xu; Yulin Ma; Intelligent Robots and Systems, 2006 IEEE/RSJ International Conference on; Oct. 9-15, 2006 pp. 639-644; Digital Object Identifier 10.1109/IROS.2006.282547.*

Dynamic stereo in visual navigation; Tistarelli, M.; Grosso, E.; Sandini, G., Computer Vision and Pattern Recognition, 1991. Proceedings CVPR '91., IEEE Computer Society Conference on; Jun. 3-6, 1991 pp. 186-193; Digital Object Identifier 10.1109/CVPR.1991.139685.*

Rendering in object interference detection on conventional graphics workstations; Baciu, G.; Wingo Sai-Keung Wong; Computer Graphics and Applications, 1997. Proceedings., The Fifth Pacific Conference on, Oct. 13-16, 1997 pp. 51-58, 218; Digital Object Identifier 10.1109/PCCGA.1997.626171.*

Developing landmark-based pedestrian navigation systems; Millonig, A.; Schechtner, K.; Intelligent Transportation Systems, 2005. Proceedings. 2005 IEEE; Sep. 13-15, 2005 pp. 197-202; Digital Object Identifier 10.1109/ITSC.2005.1520046.*

G. Schall et al., "Construction and Maintenance of Augmented Reality Environments Using a Mixture of Autonomous and Manual Surveying Techniques," Proc. 7th Conf. Optical 3-D Measurement Techniques, vol. 1, A. Grün and H. Kahmen, eds., 2005; http://www.icg.tu-graz.ac.at/Members/schall/optical3dpaper.pdf/download (cited by others).*

F. Ledermann and D. Schmalstieg, "April-A High Level Framework for Creating Augmented Reality Presentations," Proc. IEEE VR, IEEE CS Press, 2005, pp. 187-194 (cited by others).*

G. Reitmayr and D. Schmalstieg, "Dat Management Strategies for Mobile Augmented Reality," Proc. Int'l Workshop Software Technology for Augmented Reality Systems, IEEE CS Press, 2003, pp. 47-52 (cited by others).*

G. Reitmayr and D. Schmalstieg, "OpenTracker-A Flexible Software Design for Three-Dimensional Interaction," Virtual Reality, vol. 9, No. 1, 2005, pp. 79-92 (cited by others).*

G. Reitmayr and D. Schmalstieg, "Location Based Applications for Mobile Augmented Reality," Proc. Australasian User Interface Conf. (AUIC), IEEE CS Press, 2003, pp. 65-73 (cited by others).*

G. Schall et al., "Handheld Geospatial Augmented Reality Using Urban 3D Models," Proc. Mobile Spatial Interaction Workshop, Computer-Human Interaction Conf., Springer, 2007 (cited by others).*

Hand-held windows: towards effective 2D interaction in immersive virtual environments; Lindeman, R.W.; Sibert, J.L.; Hahn, J.K.; Virtual Reality, 1999. Proceedings., IEEE, Mar. 13-17, 1999 pp. 205-212, Digital Object Identifier 10.1109/VR.1999.756952.*

The effect of 3D widget representation and simulated surface constraints on interaction in virtual environments; Lindeman, R.W.; Sibert, J.L.; Templeman, J.N.; Virtual Reality, 2001. Proceedings. IEEE, Mar. 13-17, 2001 pp. 141-148; Digital Object Identifier 10.1109/VR.2001.913780.*

Effects of battlefield display frames of reference on navigation tasks, spatial judgements, and change detection; Lisa C. Thomas; Christopher D. Wickens; Ergonomics, 1366-5847, vol. 49, Issue 12, 2006, pp. 1154 - 1173.*

The Progress of AMTICS-Advanced Mobile Traffic Information and Communication System; H Okamoto, M Hase - Electronics, 1990. Vehicle Electronics in the 90's: 1990 - From http://www.ieeexplore.ieee.org.*

Bahl, P., et al., "A software system for locating mobile users: design, evaluation, and lessons," *Microsoft Research*, downloaded Oct. 4, 2005, http://research.microsoft.com/~bahl/Papers/Pdf/radar.pdf, 1-13.

Hermann, F., et al., "Egocentric maps on mobile devices," *Fraunhofer Institute for Industrial Engineering*, Germany, 2003, downloaded Oct. 4, 2005, http://www.hci.iao.fraunhofer.de/uploads/tx_publications/HermannBieberDuesterhoeft2003_Egocentric_Maps_IMC_03_Rost_.pdf, 7 pages.

Microsoft speech application SDK, downloaded Oct. 4, 2005, http://msdn.microsoft.com/library, 2 pages.

In the United States Patent and Trademark Office, Non-Final Office Action, in re:. U.S. Appl. No. 10/998,081, Filed Nov. 26, 2004, Dated Oct. 16, 2008, 9 Pages.

* cited by examiner

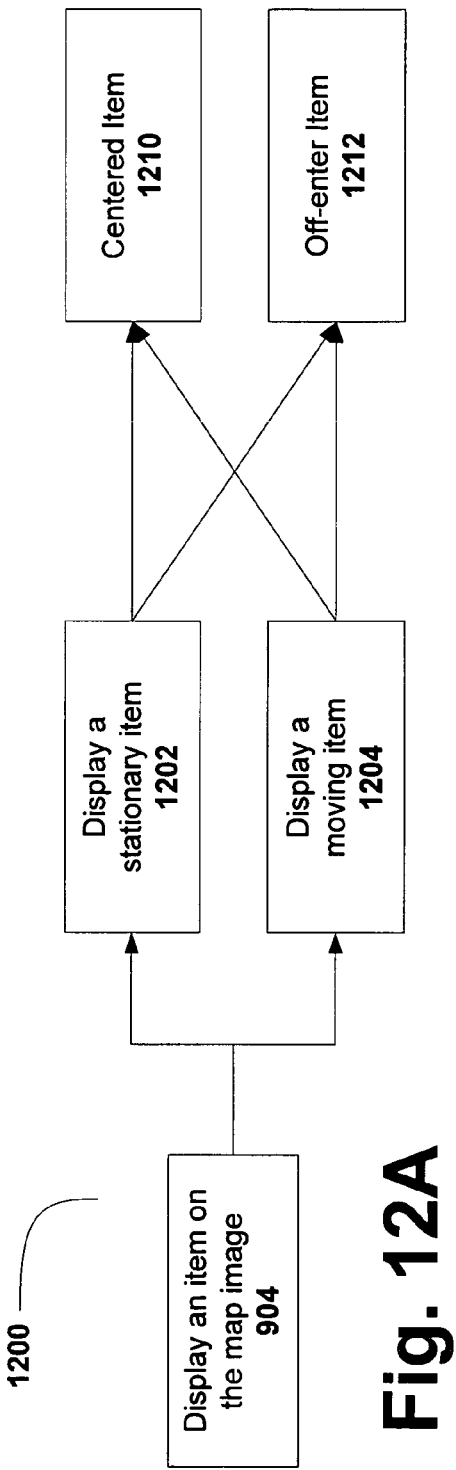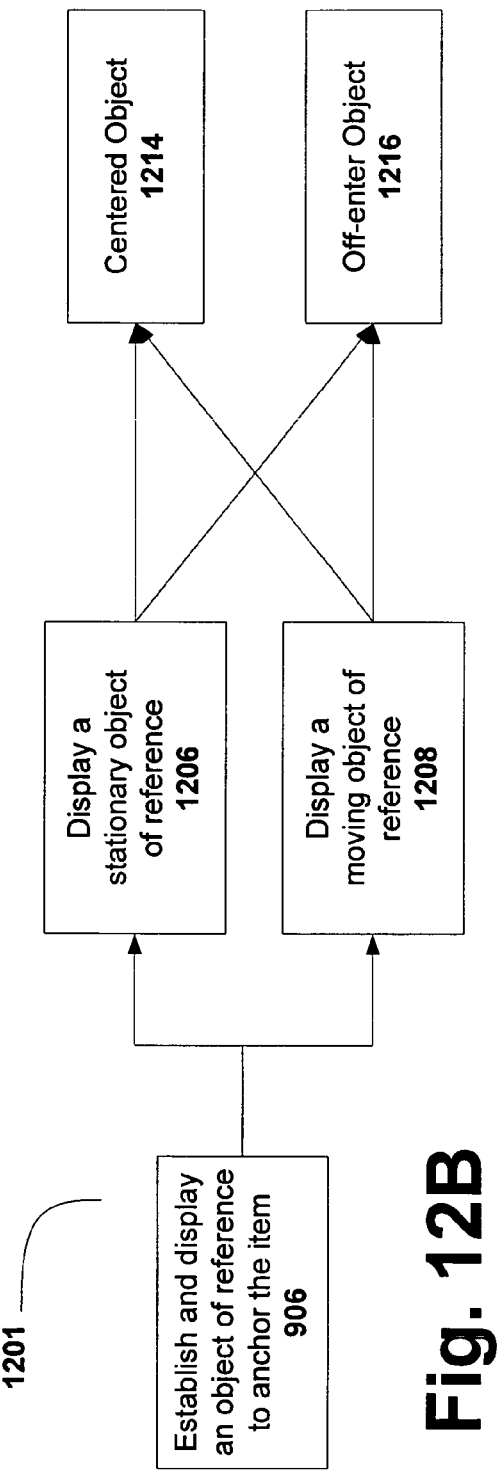

LOCATION SIGNPOSTING AND ORIENTATION

CROSS-REFERENCE TO RELATED APPLICATIONS

This application relates to U.S. application Ser. No. 10/998,081 filed Nov. 26, 2004, entitled "LOCATION AWARE MOBILE-DEVICE SOFTWARE DEVELOPMENT."

BACKGROUND

Mapping and location determination technology plays as increasing role in mobile device software applications. The ability to display dynamic maps on mobile devices and to draw spatial relationships between objects onto arbitrary maps (e.g. street maps, topographical maps, transportation system maps, indoor maps) is important to facilitate their effective usage. There are several conflicting priorities that make the effective use of maps on mobile devices difficult.

For example, there is a need for fitting high-resolution local maps and distant data on the same map. Usually users want zoomed in maps that show their immediate vicinity, or the immediate vicinity of an item they are interested in (e.g. is there parking spot near the movie theater I am going to?). At the same time, users are often interested in the relationship between the location they are looking at and items that do not fit on the current map (e.g. in what direction and how far is the closest exit to the shopping mall I am standing in?—with the current map showing all the stores in my immediate vicinity).

This problem is exacerbated because mobile devices have much smaller screen surface areas than most desktop/laptop computers and paper maps, and also have more limited input mechanisms for navigating maps. The problem exists even on a desktops which have relatively large screens and rich mouse (with buttons, roller wheels, drag/drop capabilities) and keyboard inputs, but extremely difficult on a mobile phone with its screen being 5-10% the size of a desktop screen and having only a simple keypad (or sometime touch screen) for input.

Another example of the aforementioned conflicting priorities involves the need for orientation of maps displayed on mobile devices. Mobile devices can display maps on their screens, however it is problematic for end user's to understand which way they must orientate the maps. As above, this is greatly exacerbated by the relatively small screens of the devices. The utility of having a mobile device near-instantly display a convenient map is largely defeated if the device's user must walk around trying to look at street signs and other near-range markers in an effort to orientate themselves. For a stationary desktop computer people make abstract decisions about maps so the user's physical orientation to the map is not particularly important. On mobile devices people want to make instantaneous decisions and physically orientate themselves and the digital map just as they would a map printed on paper. They will want to turn their bodies and point the mobile devices in orientations where the maps match their surroundings.

Finally, a third example of the conflicting priorities is based on the need for orientation of others based on map information. A user of a mobile device may need to guide remote individuals and give them orientation information. It is difficult and frustrating to do this if the person giving these directions can not provide the other individual with useful distance and orientation cues. Allowing the viewer of the map to easily "put themselves in the shoes of others" and relate the directions they give them to the remote users' surroundings (e.g. "Do you see the Eiffel tower in the distance in front of you? OK. Walk 4 blocks and keep the Eiffel tower on your left.)

These are but only three examples among a myriad of situations that arise when trying to display dynamic maps on mobile devices and to draw spatial relationships between objects onto arbitrary maps. Software developers building mobile applications for both indoor and outdoor usage (as well as hybrid usage indoors and outdoors) need to be able to provide the applications' users with easy to use and highly accurate distance and orientation information.

SUMMARY

The various aspects of signposting and orientation technology discussed herein provide an applications' users and developers with easy to use and highly accurate distance and orientation data and tools, respectively. For example in one aspect, location and orientation is used for signposting information that could not otherwise be conveyed in a mobile device. Items that cannot be displayed on a mobile device display are signposted. These items can include people, places, or just about any object of interest. Such signposts contain a variety of information, including but not limited to, the distance between an object of reference and the item in question, the general direction of the item to the object, and even the name of the item.

In another aspect of signposting, signposts are dynamically updated when either the object or the item moves about the map. Moreover, the object can serve to anchor the item and other items of interest, thus keeping track of items that are not in the immediate view of a mobile device display. Anchoring can be dynamically changed depending on user or developer input. In the case of the user, that input may be made via the mobile device; in the case of the developer, a programming framework can be used to develop a desired signposting (and orientation) program. The framework allows signposting on any existing or dynamically rendered map; easy and dynamic designation of the anchor point form which signposts are measured and rendered in relation to; and easy and dynamic selection of any number of objects for signposting.

In one aspect of orientation, reference marks can be superimposed on a map (in addition to signposts) in order to help mobile device user to orient themselves. Various reference mark can be used, whether the sun, the moon, or the stars. Ground-and air-based marks can also be used, such a monuments, mountains, buildings, aircraft and the like. These marks can either be moving or stationary. Additionally, vectors from an object of reference to a reference mark can be used to help a user align with the proper geographical heading.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included:

FIG. 12A presents in more detail on item of interest information discussed with reference to FIG. 9;

FIG. 12B presents in more detail on object of reference information discussed with reference to FIG. 9;

DETAILED DESCRIPTION

Overview

Signposting and orientation technology is presented. At the outset, a general description of signposting (for example, displaying information via a signpost for items that do not fit on a map image) and orientation information (for example, allowing users to orient themselves in a given environment) is presented. This general description is then fleshed out by focusing on the following aspects: directional vectors and orientation marks employed in unison with signposting; location signposting and orientation with stationary and moving items; dynamically changing the anchoring point (or center of attention) of signposted items; a varying environment for signposting and orientation (whether outdoor or indoor); centering of items on a given image map; various exemplary scenarios employing the technology; an exemplary implementation; a flexible programming framework; and finally a suitable computing environment.

Aspects of Location Signposting and Orientation

Figure 1:
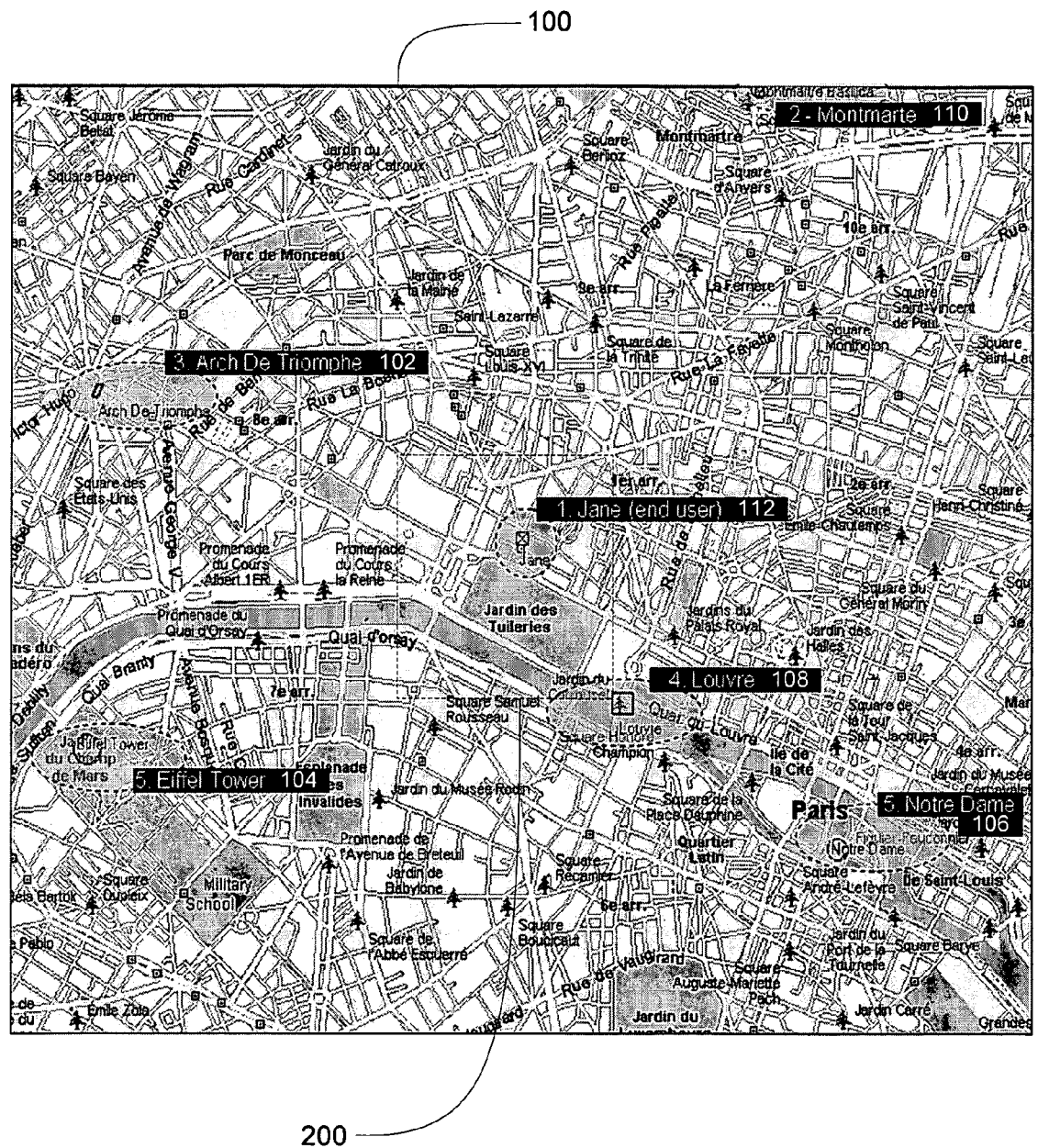
FIG. 1 illustrates typical areas of interest to a user on a map image.

There are various aspects to location signposting and orientation. In one aspect, FIG. 1 illustrates typical areas of interest to a user on a map image 100. For example, a map image 100 of the city of Paris is shown with the following areas of interest: The Arch De Triomphe 102, the Eiffel Tower 104, Notre Dame 106, the Louvre 108, and Montmare 110. A typical user 112 (in the map image 100 referred to as "Jane") of the location signposting and orientation technology is located near the center of the map image 100, near the Jardin des Tuileries.

The user 112, when looking at a map image 100 in a mobile device, such as a cell phone or any other device capable of displaying map images, is usually confined to seeing a very limited portion 200 of the map image 100. This occurs because of the typical small size of the map image 100 that can be displayed in a mobile device.

Figure 2B:
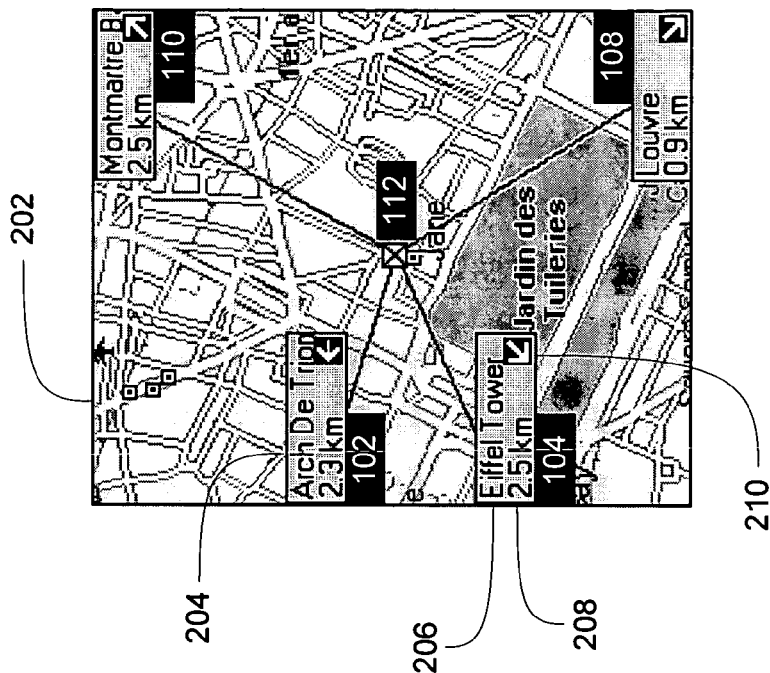
FIG. 2B uses signposting to help with the knowledge of relatively located marks and orientation of a user.
Figure 2A:
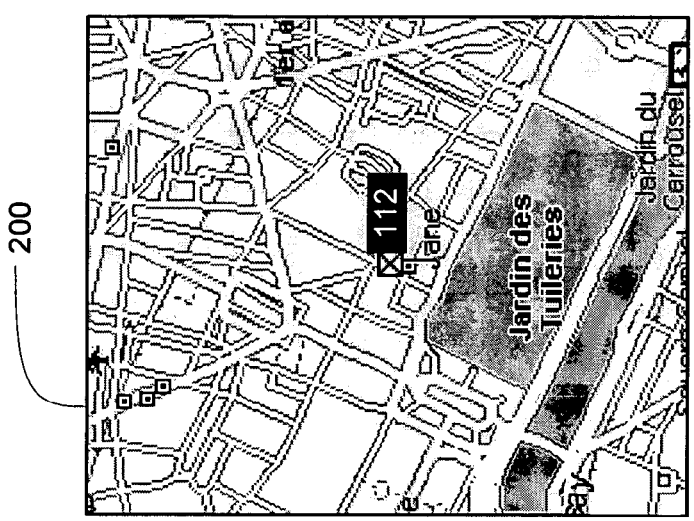
FIG. 2A illustrates a typical limited portion of a map image.

Thus, in another aspect, FIG. 2A illustrates a typical limited portion 200 of the map image 100. In this limited display 200, only the user ("Jane") 112 can be seen and the other areas of interest cannot be fit unto the limited display 200 while maintaining the desired resolution. Thus, the Arch De Triomphe 102, the Eiffel Tower 104, Notre Dame 106, the Louvre 108, and Montmare 110 are no longer present in the limited image 200, and as a result, the user 112 has a more difficult time knowing where these areas of interest are located with respect to the user 112. A natural consequence of this is that the user 112 has a more difficult orienting himself or herself, and the displayed map is itself of limited use because while it displays zoomed in details it says nothing about important destinations the user cares about. Moreover, proper orientation lends support to signposting which helps a user to understand spatial relationship to off-map items.

In contrast to FIG. 2A, FIG. 2B uses signposting to help with the knowledge of relatively located landmarks (but not just landmarks, as will be discussed below) and orientation of the user 112. Thus, in another aspect, signposts 204 are used in an enhanced map image 202 (enhanced to the limited image 200 of FIG. 2A) when the areas of interest (or alternatively, "items") are outside the limited digital map image 200.

A typical signpost 204 is shown: it has the name of the landmark, such as the "Eiffel Tower" 206, the distance 208 of the user 112 from the landmark, and an direction arrow 210 showing in which direction the user 112 should head to get to the landmark. In FIG. 2B, in one of the signposts 102, the user 112 is 2.3 kilometers (km) from the Arch De Triomphe. To get to the Arch, the user 112 should be heading to the left. In other words, the user 112 should be heading due East, if the Map is oriented towards the North and the user 112 is facing North—but this is not required, since map orientation could vary (as could the orientation of the user 112). This is just a simple example used herein for illustrative purposes, and those skilled in the art will readily recognize that the map orientation could easily be made to vary in directional orientation-and of course, the user orientation can vary almost constantly, as anyone (not even needing to be skilled in the art) can understand from personal life experience.

In FIG. 2B, with signposting in place, some of the areas of interest discussed with reference to FIG. 1 are shown in FIG. 2B in the following manner: the Arch De Triomphe 102 is due west and 2.3 km away from the user 112; the Eiffel Tower 140 is 2.5 km southwest of the user 112; the Louve 108 is 0.9 km southeast of the user 112; and finally, Montmarte 110 is 2.5 km northeast of the user 112.

Of course, these directional designations, such as "west" or "northeast", etc., are merely exemplary, and other more accurate designation could be used such as "north by northeast" or "south by south east" and so on. Also alternative descriptions could be used such as "left," "right," "up," "down," "in the bottom left corner (of the screen)" and so on. The directional arrow 210 attempts to substantially indicate the direction the user 112 should be heading to get to the area of interest.

Moreover, the display of signposts can vary also. For example, supposing there are twenty items of interest on mobile device screen map image 202, it would not be a good idea to display all twenty signposts—at least for readability purposes. Therefore, selected signposts can be displayed. For example, in FIG. 2B, only four signposts are displayed (signposts 102, 104, 108, and 110), even though the user 112 may have specified five areas of interest—as is shown in FIG. 1: areas 102, 104, 106, 108, and 110). In comparison to FIG. 1, FIG. 2B omits showing a signpost to Notre Dame 106. In short, the user 112 (or a developer using an interface to program this location signposting and orientation technology) can specify the display parameters, and assign them weights for display importance based on a variety of factors, such as, visibility, importance, closeness of distance, the desired density of signposts, and so on.

Likewise, it goes without saying that the information contained within the signposts can also be altered. The depicted signposts in FIG. 2B are merely exemplary. Thus, if for example, a user 112 wanted to fit in more information in a signpost he could easily do that. Thus, taking the Arch De Triomphe 102 signpost as an example, in addition to having the name, the distance, and the directional arrow, a user 112 or a developer could easily add a time display using a simple algorithm: The Arch De Triomphe is 2.3 km away, assuming a typical human walks 6.8 km per hour, the user should get to the Arch in about 30 minutes (distance divided by speed equals time, or, put another way: 2.3 km÷6.8 km per hr=30 minutes). Alternatively, miles instead of kilometers could be used, and so on. In short more or less information can be used depending on what is desired: if a lot of information is desirable to be displayed per signpost, fewer signposts will fit onto a screen.

Aspects of Directional Vectors and Orientation Marks in Unison with Signposting

Directional vectors and orientation marks may be used in unison with signposting in order to at least orient the user 112. Thus, in another aspect, in FIG. 3, the user 112 is near the "Jardin des Tuileries" and sees on a display screen 300 that the Eiffel Tower is 2.5 km west-southwest of her position. Similarly, Notre Dame 106 is roughly southeast of her. However, the user 112 may have a problem figuring out how to align herself in the first place. She may not know which way is west-southwest.

Thus, orientation marks or "cues" may be used, such as the sun. Actually, any celestial body may be used, whether the sun, the moon, the stars (the kind visible at night, thus excluding the sun), etc. Likewise, ground-based marks can be used, such as the Eiffel Tower itself—which, interestingly enough, may be both an area of interest and an orientation mark.

Figure 3:
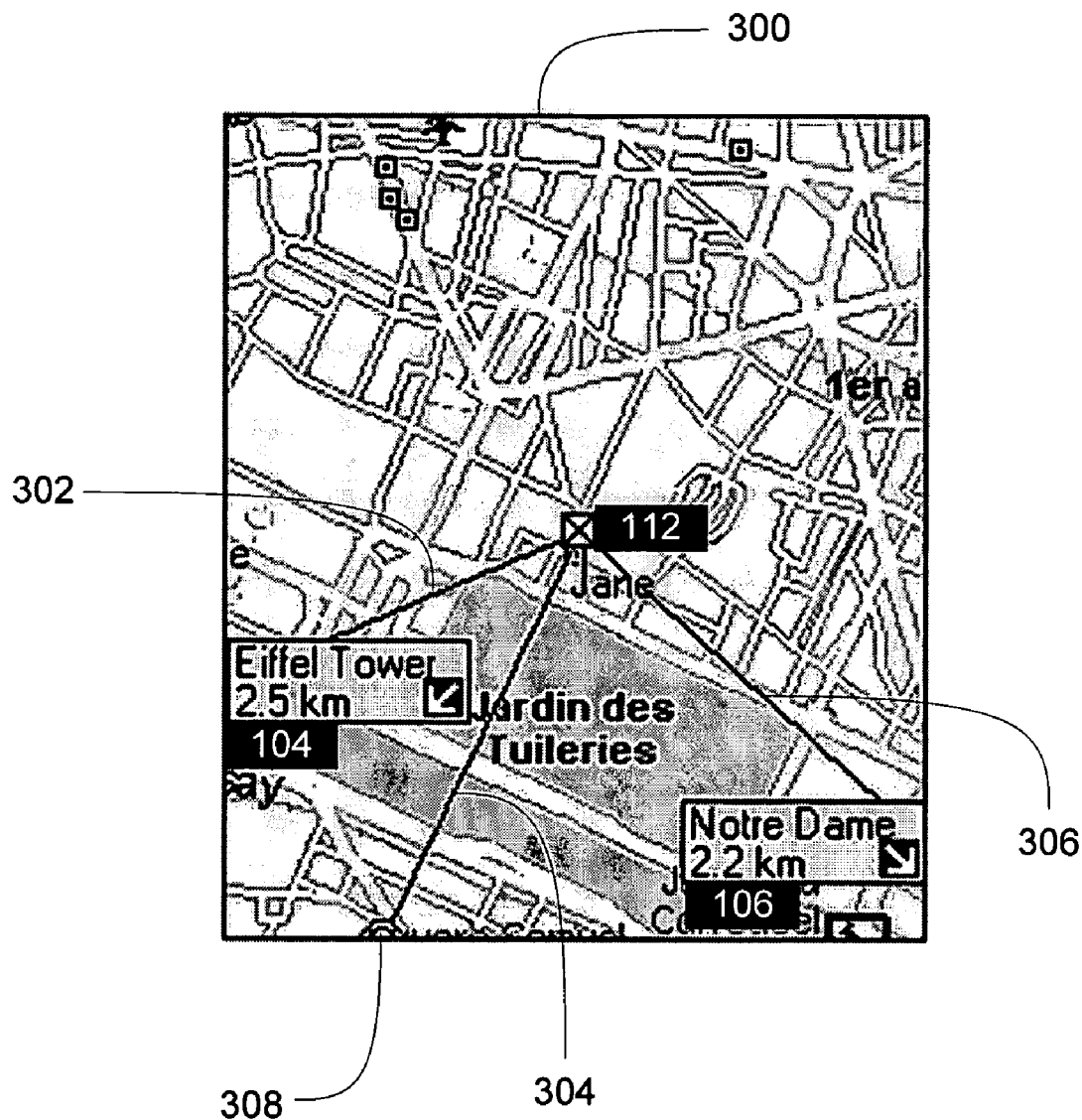
FIG. 3 illustrates exemplary orientation marks.

In FIG. 3, the sun 308 is used as an orientation mark. The user 112 can align herself with the sun 308 and then walk towards, for example, the Eiffel Tower by keeping the sun on her northwest side (or to the upper left of her as she is walking). Helpfully, directional vectors 302, 304, and 306 are provided that allow the user 112 to align the display screen or map image therein 300 with the subject of interest, such as the sun, thus aligning an imaginary line from the user 112 to the sun 308 with the directional vector 302. The directional vectors are not only available for the orientation marks 308 but also for the other signposts 104 and 106. Thus, the Eiffer Tower signpost 104 has its own directional vector 302 anchored to the user 112, and the Notre Dame signpost 106 has its own directional vector 306. These directional vectors and orientation marks can be display or not displayed depending on the needs and desires of the user 112 or a developer coding a location signposting and orientation program.

Aspects of Location Signposting and Orientation with Stationary and Moving Items Thus far, the target areas of interest, such as those displayed in FIG. 1, for instance, the Arch De Triomphe and the Eiffel Tower, were stationary. These areas of interest (in other words, "items" on a display screen of a map image) were in one place and the user 112 was moving toward them. However, any items (even all items) that are displayed on a map image, can be moving about the map image, whether inside the displayable boundaries or outside the boundaries. These items can maintain dynamic relationships, such as a distance relationship between one item and another item that is dynamically update as the item move, either towards each other or away from each other.

Figure 4:
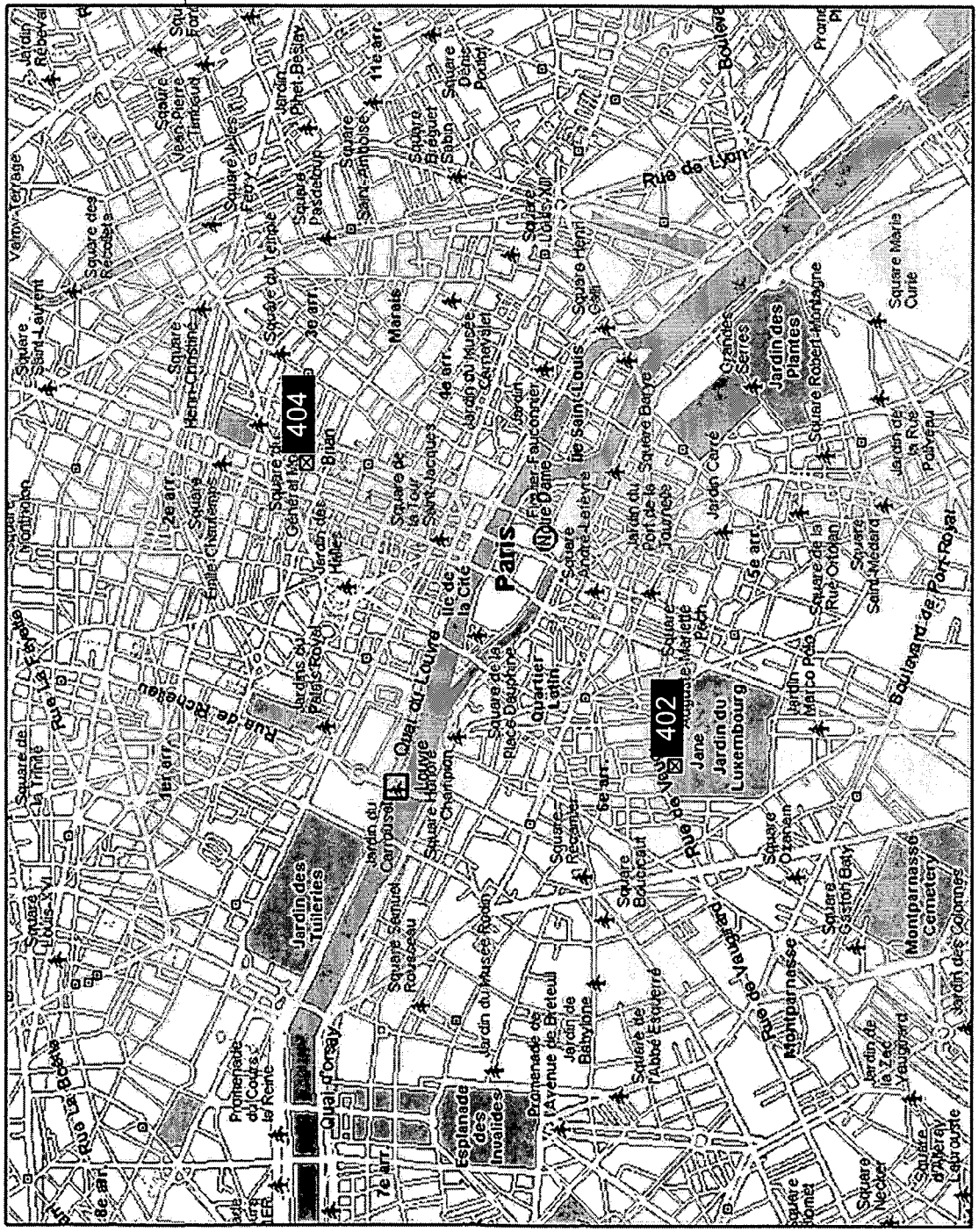
FIG. 4 illustrates at least two items moving about an image map.

FIG. 4 illustrates at least two items moving about an image map 400. A first user 402, "Jane", and a second user 404, "Brian". As the first user 402 or the second user 404 moves about, such a user may either enter into a display screen of a mobile device used by a user or go beyond such a display screen (in which case signposting is an option to keep track of the other user).

Figure 5B:
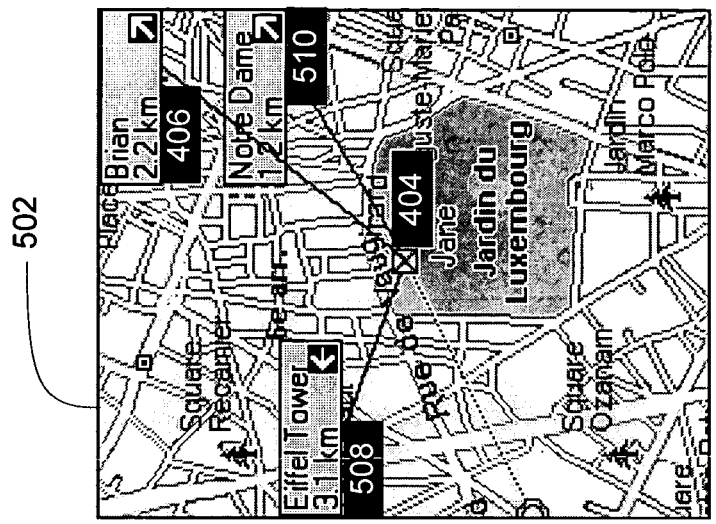
FIG. 5B illustrates signposting that keeps track of relationships between moving items on a map image display screen.
Figure 5A:
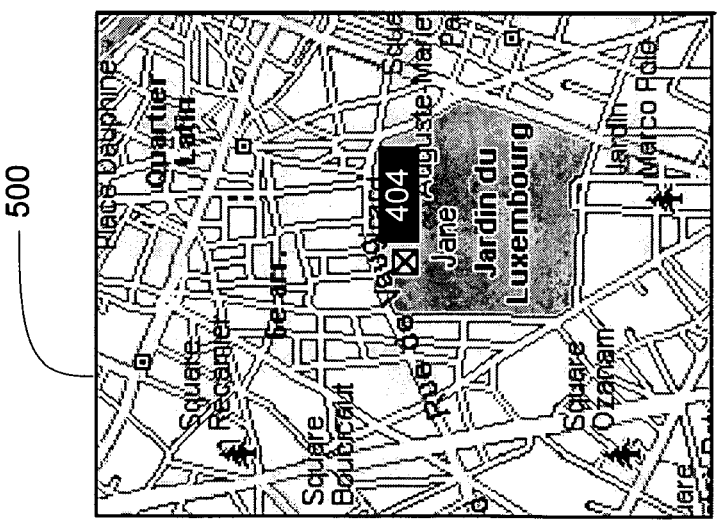
FIG. 5A illustrates what happens if a first user is trying to track the movement of a second user via a mobile device display screen.

FIG. 5A illustrates what happens if a first user 404 is trying to track the movement of a second user 406 via a mobile device display screen 500. In short, the second user 406 is not visible—for the reasons already discussed above, with reference to FIGS. 1, 2A and 2B. To remedy this problem, FIG. 5B illustrates signposting that keeps track of relationships between moving items on a map image display screen 502. Thus, user one 404 is the object reference that anchors the second user 406 (although either user could be the anchor—as well as a third item, separate from the first two items—and neither item has to be in the center of the display screen 502, that is, either item could be off-center) as the second user 406 moves about outside the display screen 502.

However, user one 404 keeps track of user two 406 via signposting. As either of the users moves about, their relationships are dynamically updated. For instance, the distance between the two users is dynamically updated. In FIG. 5B, that distance is 2.2 km, as can be seen in the "Brian" (i.e. user two) signpost 506. The signpost tells user one 404 that user two 406 is 2.2 km northeast of user one 406. Likewise, stationary items on the display screen 502 are also tracked. The Eiffel Tower 508 is 3.1 km west by northwest from user one 404, and Notre Dame is 1.2 km east by northeast from user two 404. Of course, as user one 404 moves about, these latter distances are also dynamically updated.

Aspects of Dynamically Changing the Center of Attention of Signposted Items

Figure 6:
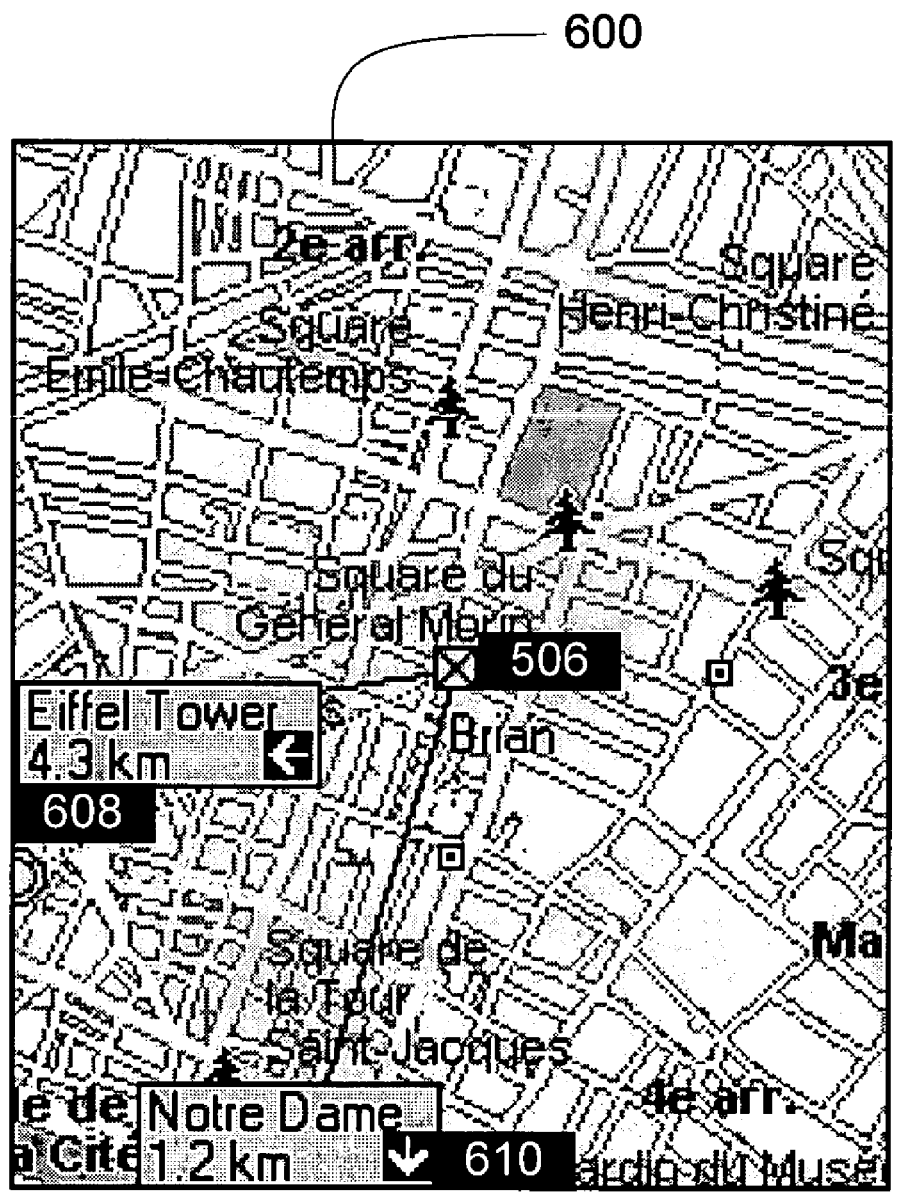
FIG. 6 illustrates that the center of attention or display can also be changed while maintaining signposted items relationships.

Building on FIG. 5B, FIG. 6 illustrates that the center of attention (which can be an anchor point) or display can also be dynamically changed while maintaining signposted items relationships. Thus, in contrast to FIG. 5B where user one 404 is the center of attention (i.e. in the middle of the display screen 502), now the second user is displayed preferentially near the center of the display screen 600. Thus, now the signposts are calculated from the second user's 406 point of view. This means that user two 406 is now the anchor to any related items.

For example, user two 406, or "Brian", is 4.3 km away from the Eiffel Tower 608 and 1.2 km away from Notre Dame 610. Although the signpost for the first user 404 is not shown in FIG. 6, this could be easily accomplished in the manner discussed with reference to FIG. 5B.

As will be readily appreciated by those skilled in the art, numerous aesthetic improvements could be made to the display 600 in FIG. 6. For example, in the current configuration, both signposts 608 and 610 are at the edge of the display 600. However, one could easily move these signposts around, so that items further away, say, 100 km away appear on the edge of the screen, while those closer, say, 1 km away, appear close to the anchoring object of reference. Likewise, the size of any signpost could vary depending on the distance, as could the color—say, faded color for objects far away and bold, conspicuous color for those near (yet off the display screen 600). There are many such touches that may be implemented to make the relationships displayed on the screen 600 more intelligible for any user.

Furthermore, the image maps used so far have been two dimensional (2-D) image maps, because such maps are easier to visualize and discuss. However, the aforementioned and following aspects are also applicable to three dimensional (3-D) maps. Thus, not only horizontal, i.e., x and y coordinate relationships (in a Cartesian sense) may be maintained via signposting and orientation, but also vertical or z coordinate relationships may also be maintained. Those skilled in the art will readily appreciate that for such 3-D signposts, merely more information would have to be displayed in the signposts. Thus, a signpost might display that the Eiffel Tower is not only 4.3 km away 608, but also that to get there, user two 506 has to go uphill (or, additionally, climb 300.51 meters or 986 feet to get to the top of the tower). For the persnickety user, a signpost might even inform the user that the Eiffel tower changes in height by about 15 centimeters, depending on the temperature, thus there might be an extra, albeit small, climb in store for the user.

Aspects of a Varying Environment for Signposting and Orientation

The aspects of signposting and orientation technology discussed so far have been confined to an outside environment, but they could just as easily be used in an indoor environment (including transportation system environments). FIG. 7A illustrates an indoor signposting scenario. A user 704, "Jane", is at the center of a mobile device display 700, and the user 707 is 12 m (meters) away from the copier_X 706 and 28 m away from copier_C1 710. Thus, if the user 704 wants to make copies, for instance, she can go the nearest copier, namely, copier_X 708. Likewise, the user 704 is shown the distance of other individuals (a subspecies of "items") in the indoor environment. Thus, "Doug" 708 is located 10 m away from the user 704, "Jane".

Figure 7B:
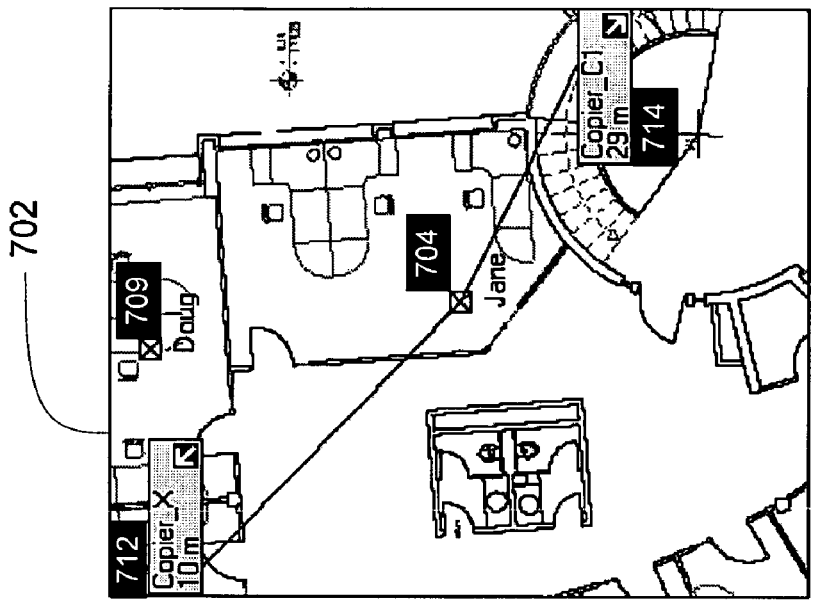
FIG. 7B illustrates, in relation to FIG. 7A, that relationships between items can dynamically change and be updated.
Figure 7A:
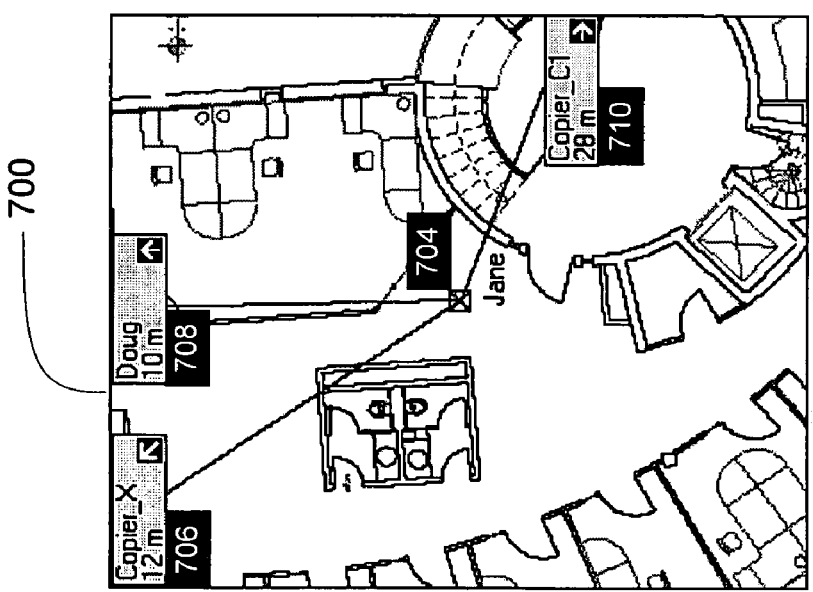
FIG. 7A illustrates an indoor signposting scenario.

FIG. 7B illustrates, in relation to FIG. 7A, that relationships between items, such as the user 704, the copiers 706 and 710, and other individuals 708, can dynamically change and be updated. Thus, in FIG. 7B, as the user 704 moves about the office, the distances change (other relationships may also change). Now, Copier_X 712 is 10 m away from the user 704 and Copier_C1 is 29 m away from the user 704. Interestingly, now that the user has come closer to other items on the display 702, signposting is turned off. Thus, now "Doug" 709 fits in the display 708 and his signpost 708 is turned off. However, if the user wishes to do so, the signpost 708 can be kept turned on (or alternatively, with respect to FIG. 7A, even though "Doug" 709 maybe off screen his signpost 708 can be turned off anyway, especially if the user 704 is not interested in Doug's position).

Aspects of Centering of Items

Figure 8:
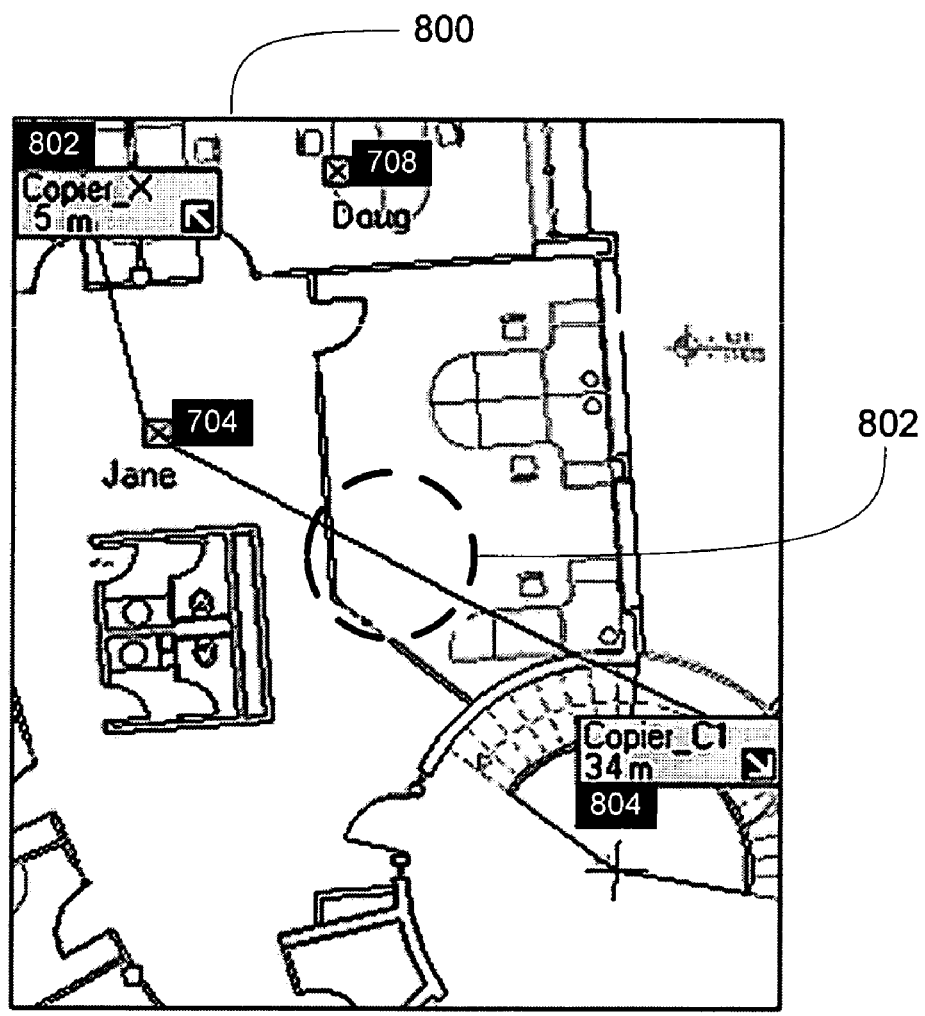
FIG. 8 illustrates the off-center aspect of items displayed on a typical display.

The above discussion alluded to the notion that items do not have to be centered on any particular screen display. For example, with regard to FIG. 8, a display 800 has the same items as the previous figure, namely, FIG. 7B, however, the difference is that neither of the items are in the center 802 of the display 800 (the center 802 of the display 800 is indicated by a dashed circle). Thus, as "Jane" 704 moves closer to Copier_X 802, now only 5 m away from her, as an item on the display 800, she moves off center 802. Likewise, her distance relationship to the other copier, Copier_C1 804, has now increased to 34 m.

Various Exemplary Scenarios

The aforementioned technology may be used in various exemplary (i.e. sample) scenarios. For example, with regard to orientation, a user may be looking at a detailed street-map in a neighborhood of Paris he is not familiar with. His location is displayed on the map because his mobile device as global positioning (GPS) hardware. However, he is disoriented because the streets are windy and not well signposted. He's trying to find his way to "Le Petit Café" to meet some people. It may be night-time, but he can see the Eiffel tower several miles away. He would like to know the orientation of the Eiffel tower relative to the "zoomed in" map he's looking at. At the same time he wants the map to show the distance & orientation to "Le Petit Café". Based on the line or vectors on the map pointing to the Eiffel tower, he's able to physically orientate himself and the device. He sees that "Le Petit Café" is "up and to the left" about 2.5 km. Based on this information he's able to start his walking journey going in the right direction.

As hinted already above, the present technology also assists in orientating others, remote from their location. Again, using the same example of a user as above, the user is in Paris and receives a phone call from his friend Sue. Sue is supposed to meet him at "Le Petit Café" but is currently at the Notre Dame church. Based on this information, the user can place her on a map of Paris (at Notre Dame). (Alternately, if she had a device that supported it, she could have electronically sent the user her location). The user is able to look at her location on a detailed (i.e. zoomed-in) street map, but at the same time see her distance and orientation to other landmarks (e.g. to the Eiffel Tower, to the Louvre, the Pompidou museum), to the sun, which is shining brightly this day. He can also see her location relative to "Le Petit Café" which is where he's currently standing. Based on this information he's able to tell her which way to face (based on landmarks she can see, and also based on the sun, e.g. "the sun should be to your right"), and how far she should walk to come meet the user.

Furthermore, the aforementioned technology can assist in making location aware decisions, and pivoting orientation data, based on multiple locations. Again, focusing on the exemplary user, he's in London and speaking with a friend, Brian, on the phone who is somewhere several miles away. The user and Brian agree to meet for coffee, but have not decided on where yet to meet. The user is able to place both Brian and himself onto a map, and also bring up the locations of the coffee shops in the neighborhood. He's able to look at the coffee shops and see their relationship to himself and Brian. He's able also to see the locations of Tube stops (a.k.a subway stations) in the neighborhood. Very quickly he's able to visually pivot on several pieces of information: he can see his location and the coffee shops near him (displayed on the map if they are close, otherwise indicated by distance and direction with a signpost of they are off the map); he can see Brian's location and the coffee shops near him (displayed on the map if they are close, otherwise indicated by distance and direction with a signpost of they are off the map); he can pick a tube stop (quite possibly by switching rapidly from a street map to a tube schematic; both having appropriate signposts displayed on them as required), and see the coffee shops near it. He can see that there is a good coffee shop, "The Queen's Beans", near the "Notting Hill" station. The Notting Hill station however has four different exits on different street corners and can be confusing to navigate from. The user is able to choose the tube stop and see its distance to the coffee shop, and both its and the coffee shops orientation relative to the afternoon sun. He sees that the when exiting the tube stop it is necessary to walk three blocks with the "sun to his left" (north) to arrive at the coffee shop. He's able to relay this information to Brian, and they agree to meet there in 30 minutes.

Another scenario involves orientating oneself while hiking in the mountains. A user may be hiking in the mountains and have a GPS receiver with him. Friends of his have indicated a GPS location where they would like to meet that evening. The user can see Mount Rainer off in the distance but is interested in looking at a much more zoomed in map that shows 15 km of hiking trails. His electronic map is able to show him the zoomed in map with three directional signposts, one shows the direction and distance to the meeting point. The second shows the direction to Mt. Rainier. The third shows the direction to the sun. Based on these cues, he is easily able to orientate himself and head to meet his friends.

In addition to these outdoor scenarios, there are various indoor scenarios. For example, a user may ask herself where there are multiple exits to a building relative to where she is standing? Which of these exits is closest? If the user is facing the elevators, which way does she need to spatially orientate her device in order to make sense of the map? If the user can see the sun outside the window of the office she standing in, what way should she orientate her device relative to this in order to have a correctly orientated map of the building she's in? If the user is speaking to someone on the phone in another building, and they have sent their indoor location to her, what exit of their building should she tell them to go out of to meet her outside? All of these questions can easily answered by the signposting and orientation technology.

It should be noted, that all of these features discussed in the exemplary scenarios above, such as the use of GPS technology in conjunction with the present signposting and orientation technology, is merely exemplary discussion but not limited to such technologies. Other equivalent and complementary technologies may also be employed, as will be appreciated by those skilled in the art.

Aspects of an Exemplary Implementation

Figure 9:
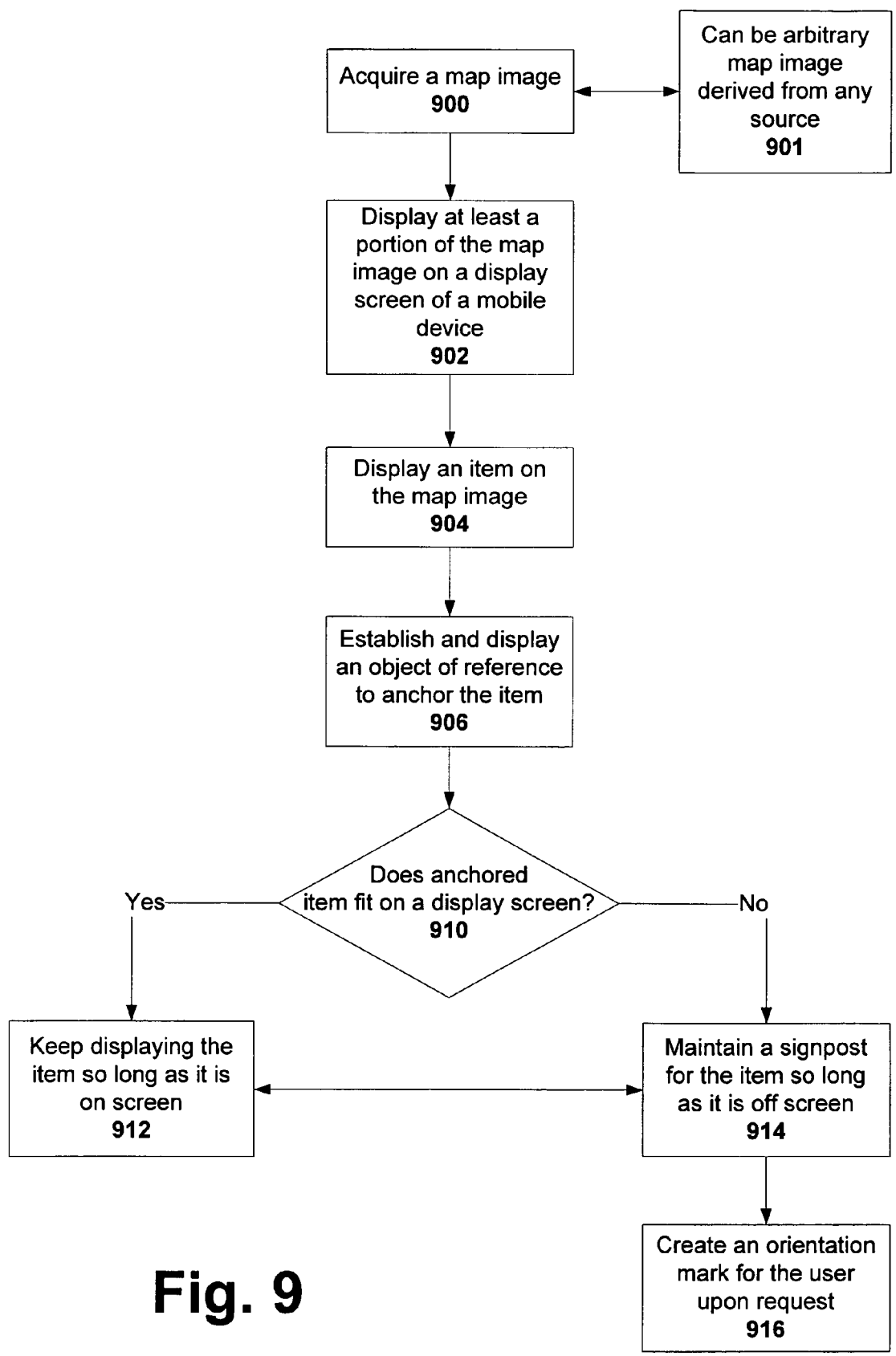
FIG. 9 presents a flow chart that shows in block form how one, merely exemplary and in no way dispositive, implementation might be set-up.

There are numerous implementations of the above discussed aspects. For example, FIG. 9 presents a flow chart that shows in block form how one, merely exemplary and in no way dispositive, implementation might be set-up. Thus, at block 900 a map image is acquired. The image may be acquired from a pre-stored source in the mobile device that displays the image, or from an outside source, whether some kind of memory device or a result of downloading (either from some map source or even from another user).

Block 901 addresses the notion that the acquired map 900 can be any arbitrary map image derived from any source—as mentioned above. Thus, the maps that are displayed on a screen of a mobile device may have various resolutions and be stored in various formats. So long as signposting and orientation information can be superimposed on the map image, any arbitrary map will do.

At block 902, at least a portion of the acquired or dynamically rendered (by a rendering engine) map image is displayed on the mobile device. Since mobile devices, such as cell phones, pagers, or personal digital assistants, typically have small display screens, the entire map image cannot be displayed (although, it should be noted that if the display is big enough or the map small enough, the entire map image or a substantial portion thereof could potentially be displayed). Thus, a portion of the map is displayed, where that portion may have several items, such a people or landmarks, displayed on it.

At block 904, such an item is displayed on the map image. In one aspect, it can be superimposed on the map image, such that the item's relation to the surrounding geography can be seen. Also, as mentioned, multiple items, either those moving about the map image or those that are stationary, can be displayed. In another aspect, one item, the anchoring item with respect to other items on the map image, the so called "object of reference", can be displayed in the center of the map image, and any item that do not fit on the display can be signposted. It goes without saying, that the more a user of a mobile device zooms in on any given map, the more signposts will appear (if so desired), since signposts attempt to remedy at least the problem of maintaining a map at a certain level of particularity while maintaining information regarding relationships about items that could not fit on a display at that level of particularity.

At block 906, once the item of interest is displayed, an object of reference to anchor that item is established. Just to underscore that FIG. 9 is a mere exemplary implementation of the aspects discussed so far, the anchoring object of reference could be established first and then the item could be displayed (i.e. blocks 904 and 906 could switch temporal order). However, in this particular implementation, once the item is displayed it is anchored to an object of reference. This object can be located anywhere on the display screen (it can even be located outside the screen, if so desired, in which case it would have a signpost to it—again, if a signpost were desired in the first place). The anchoring of the item to the object allows for signposting to maintain certain relationships between the item and the object. For example, a distance relationship and a directional relationship can be displayed. Interestingly, in one aspect, the anchoring is still maintained even though items and objects move about, or appear of disappear from the display screen.

At block 910, one the anchoring is complete, a decision is made whether the anchored item, for example, its on the display screen of the mobile device. Although, any one skilled in the art will quickly recognize that different decisions could be made at this point. For instance, a decision could be made as to whether the object of reference fits on a display screen. Alternative, a decision could be made as to whether both the item of interest and the object of reference fit on the display screen, and so on.

At block 912, if the answer to the question posed at block 910 was yes, namely, that the anchored item does indeed fit on the display screen, then the item is just displayed as before. And it is kept displayed as long as it fits onto the display screen. Now, it should be recognized that a user of a mobile device may change this situation by either zooming in or zooming out of a map image. For instance, suppose a user is looking at an item on the map image and suddenly decides to zoom in on a particular portion of the map away from where the item is displayed. If the user zooms in enough, the item will no longer fit onto the display (that is, it will still be located on the map image itself, but it may no longer be displayable of a mobile device screen).

In such a scenario, at block 914, once the item is no longer displayable, a signpost is maintained for it so long as it is off the screen. Signposting is either turned on or off depending whether the item is displayable for not, thus, with reference to the flow chart, the signposting and orientation system keeps alternating states between blocks 912 and 914.

Moreover, when the system is at block 914, there is the option of implementing block 916. At block 916, an orientation mark is created for the user, either upon request (as illustrated) or upon some other condition, such as a developer setting up the system to display orientation mark and corresponding direction vectors to help user to orientate themselves. As mentioned above, and as is discussed in more detail below, these orientation marks may take on a variety of forms, from celestial bodies to grounded bodies.

Figure 10:
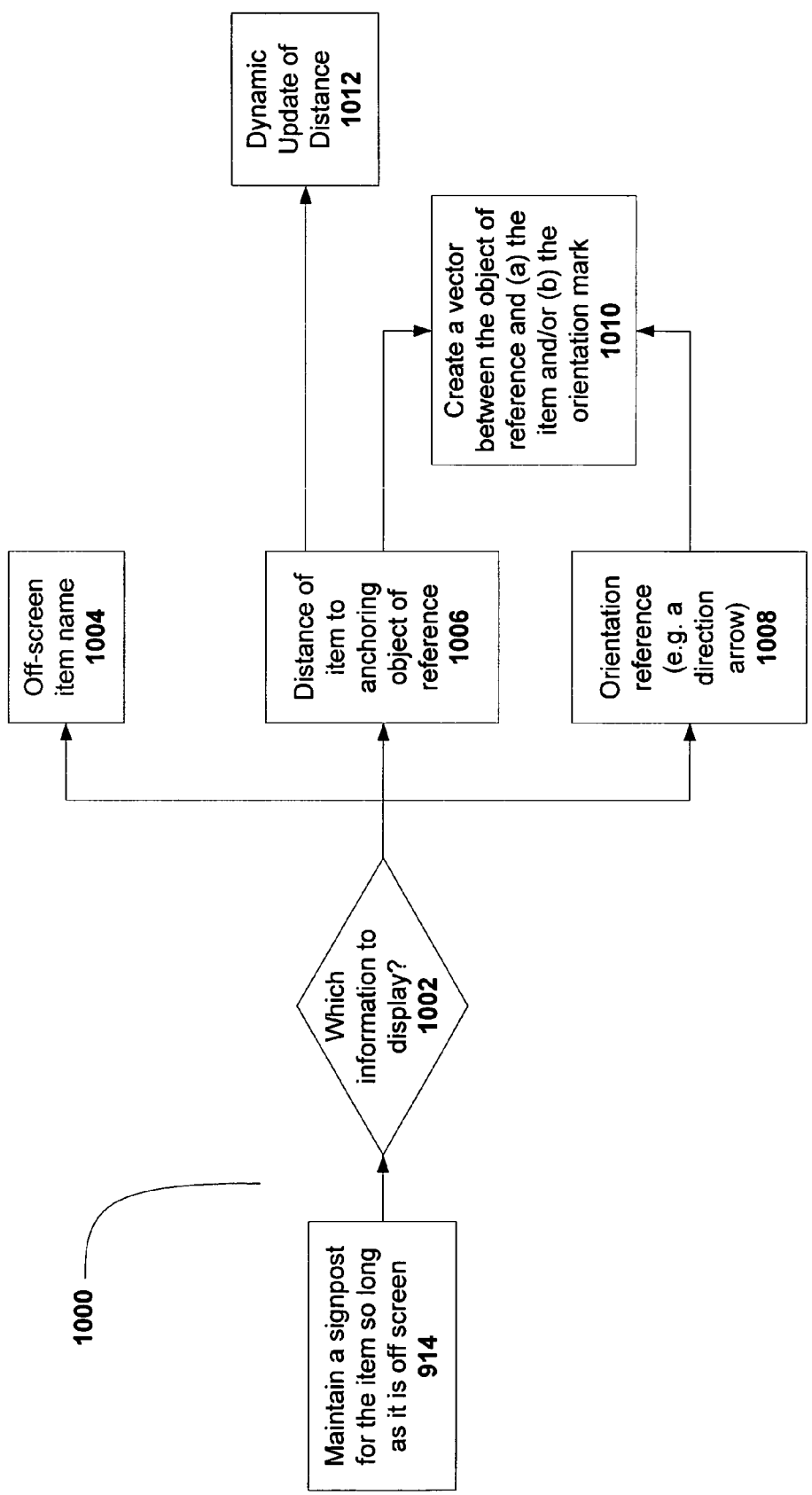
FIG. 10 presents in more detail on signposting information discussed with reference to FIG. 9.

FIG. 10 expounds in more detail on block 914 briefly discussed with reference to FIG. 9, above. Thus following block 914 that maintains a signpost for an item so long as it is off the display screen, at block 1002 a decision has to be made as to which information is to be displayed.

Numerous choices abound, and in one case, at block 1004, the name of the off-screen item is displayed. A name, of course, is just an example, and numbers could be used instead or just about any identifying symbol for an item. Moreover, at block 1006 the distance of the item to an anchoring object of reference is also displayed, although other relationships could also be displayed, such as the temporal relationship between the object and the item. Finally, at block 1008, an orientation reference is used to point in what direction an object of reference must be moving in order to reach the item. The orientation reference need not be pointing exactly in that direction, i.e., as would a vector, but can point substantially in that direction. Of course, as mentioned above, for a more accurate depiction, orientation mark with vectors to objects of reference could easily be used if the user or developer wished to do so.

At block 1010, such a vector between an object of reference and an item and/or an orientation mark can be created. This type of vector allows a user to use the vector to align himself with an orientation mark, such as the sun. It also helps to clarify special relationships between signposted items, orientation marks, and objects of reference.

Lastly, at block 1012, any of the discussed or other relationships displayable in signposts can be dynamically updated. Thus, items could change names, if for example one item corresponds to a user with a mobile device and then hands off that mobile device to a second user who will be tracked via the mobile device (say, for example, "Jane" hands of her mobile device to "Brian", in which case the signpost name would have to be updated—if the tracking is being done person-by-person). However, tracking can also be done mobile device-by-mobile device, so that even if the device is handed off from one person to the next, the name remains the same. All of this, of course, presupposes that the mobile device is the item on the map image—and it could easily be so, especially if it can send its location information to another mobile device—a feat easily accomplishable and knowable by those skilled in the art. But, additionally, a user could merely tell another user of her location and tracking could be done in this manner (although dynamic updating might be more challenging, since such updating would depend on the former user's updates).

Figure 11:
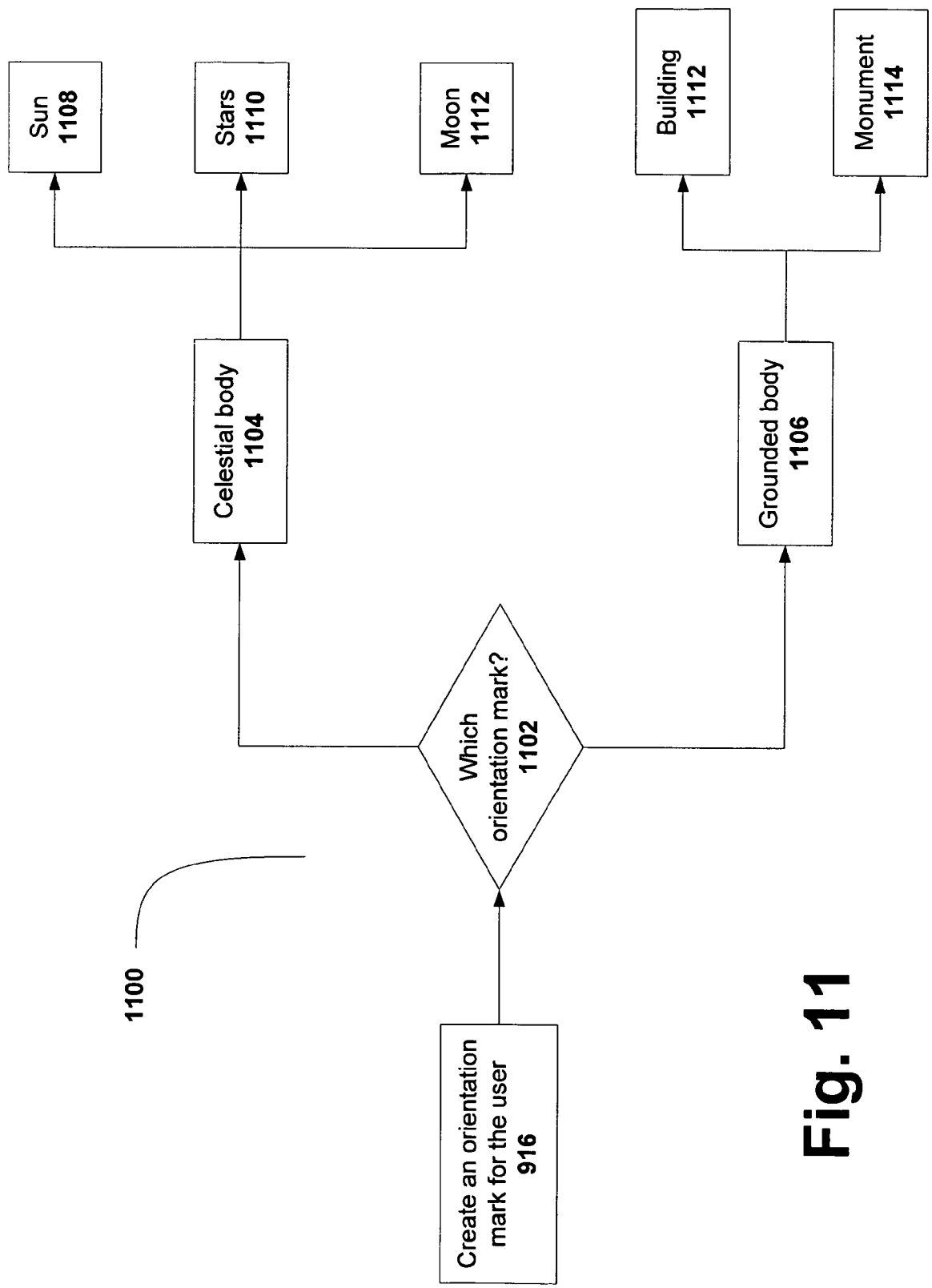
FIG. 11 presents in more detail on orientation mark information discussed with reference to FIG. 9.

FIG. 11 expounds on orientation mark creation briefly discussed with reference to FIG. 9. Thus, following block 916, at block 1102, an antecedent question might be which orientation mark to create in the first place. Numerous choices are provided by the system mentioned above. For example, at block 1104, celestial bodies may be used to orientate a user as to his position. At block 1108, a sun may be used, or if the user is using the system at night, at block 1110 stars may be used. Or alternatively, if the user is in a city at night and stars are not visible, at block 1112 a moon can be used as an orientation mark. Or, if in this latter situation, it is a city moonless night, other marks can be used such as lighted towers, and so on.

In addition to some of the celestial bodies discussed above with reference to blocks 1108, 1110, and 1112, at block 1106 grounded bodies can also be used. As mentioned, on a moonless city night lighted towers can be used, but in reality any visible building or monument can be used. Thus, at block 1112 buildings such as the Louvre museum can be used or at block 1114 monuments such as the Eiffel tower can be used. In short, as far as orientation marks go, any visible object that can be leveraged by the user for orientation purposes can be used.

FIG. 12A illustrates the various item location combinations, building on discussions with reference to FIG. 9. In FIG. 12A, at block 904, once an item is displayed on a map image, as can be seen at block 1202, a stationary item can be displayed, or as can be seen at block 1204, a moving item can be displayed. In the latter case, such a moving item can either be centered on a display screen (block 1210) or it can be displayed off-center (block 1212). Similarly, in the former case, a stationary item (block 1202) can be either centered (block 1210) or be off-center (block 1212).

What holds true for items, also may hold true for objects of reference. In FIG. 12B, at block 906, once an object of reference is established and displayed, such an object can either be stationary (block 1206) and centered (block 1214) or stationary (block 1206) and off-center (block 1216). Similarly, an object can be moving (block 1208) can either be stationary (block 1206) and centered (block 1214) or stationary (block 1206) and off-center (block 1216).

Aspects of a Flexible Programming Framework

Figure 13:
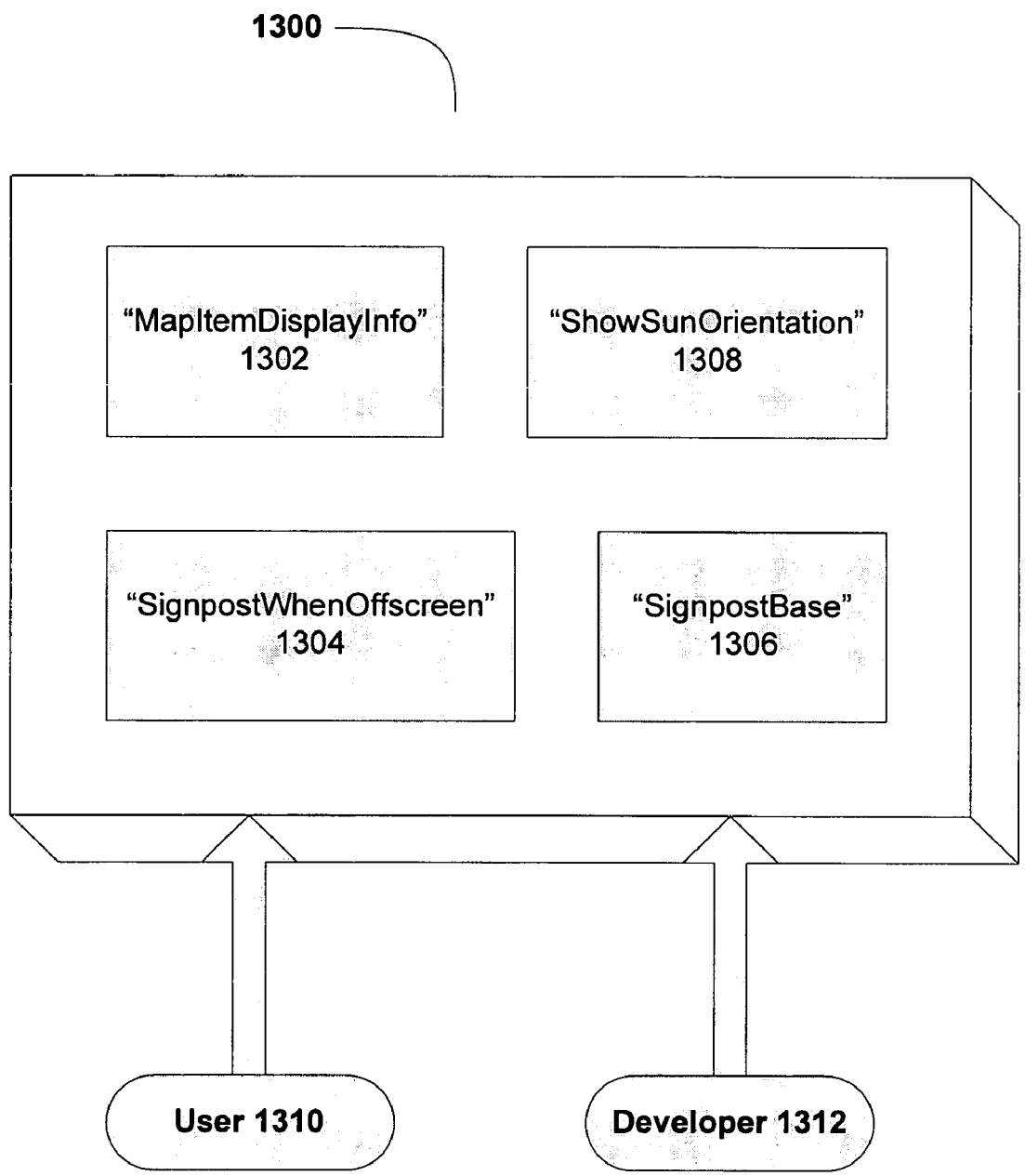
FIG. 13 illustrates a flexible programming framework for the signposting and orientation technology.

In one aspect of this signposting and orientation technology, a flexible programming framework can be implemented for use by application developers (and especially for the development of software running on mobile devices) in order to take advantage of this technology. With reference to FIG. 13, the framework 1300 consists of a set of programming interfaces 1302, 1304, 1306, and 1308 for both application developers and software developers building map-rendering technology (but it can be used by end-users also through user interface elements that expose access to this interface). These interfaces allow for each item that can potentially be displayed on top of a map to be associated with data structures. For example, one data structure, such as "MapItemDisplayInfo" 1302, contains properties that describe the rendering characteristics (e.g. color and visibility) of the item if it is to be drawn onto the map. This data structure also has a property called "SignpostWhenOffscreen" 1304 that determines if the item should have a signpost drawn to it if it cannot be displayed on the screen displayable portion of a map.

The following is a high level description of the code from "MapItemDisplayInfo" 1302:

---

MapItemDisplayInfo

Namespace: using EMIC.LocationServices.LocationUIControls
Assembly: EMIC.LocationServices.LocationUIControls.DLL
EMIC.LocationServices.LocationUIControls This class wraps access to an ItemOfInterest or AreaOfInterest object and controls its display characteristics within a MapDisplay control. An instance of this object is returned when an ItemOfInterest or AreaOfInterest is added to a MapDisplay control.

-continued

Properties that dicate how the map item will be visually displayed:

Visible property

TRUE = the items should be attempted to be rendered onto map images.
FALSE = do not render the item onto map images.
SignpostWhenOffscreen (1304) property If set to TRUE, if this item/area can not fit into the screen of the current map, a signpost is drawn to indicate what direction and how far the item is.
Emphasis property Returns the visual emphasis of the item. (e.g. Enabled/Disabled/Selected). If the MapDisplay supports highlighting, this property is used, otherwise it is ignored.
PreferredFont property The preferred Font to be used when rendering text for the item.
. . . <a host of other properties> . . .

Properties that dicate the relative importance of the item relative to other items to be dislayed on map:

MapWeight property

Returns the relative map weighting this item has when new maps are queried for. Items/Areas with higher MapWeight values will be more likely to be on, and in the center of selected maps.
. . . <a host of other properties> . . .

Additional properties that allow access to other aspects of the map item:

AsItemOfInterest property

If the contained Item or Area can be cast to an ItemOfInterest, the object pointer is returned. Otherwise NULL is returned
. . . <a host of other properties> . . .

As can be seen directly above, one of the properties 1304 deals with signposting. Given a sample object, such as "Jane", the following code could be implemented to signpost the object if it is off the edge of a map being displayed:

m_displayInfo_areaJane.SignpostWhenOffScreen=true;

Through the "MapItemDisplayInfo" 1302 interface, either the developer 1312 or even an end-user 1310 can set the signposting properties described throughout this description.

There are numerous other interfaces in the aforementioned framework. For example, an object that displays a map can have a "SignpostBase" property 1306. This property indicates what Item should be used as the anchor point to measure distance and orientation form. If the property is not set (i.e. set to a value of NULL) then the center of the current map is used. For example, the following code could be used:

```
//----------------------------------------------------------------
// Make the signposting center item the user "Jane"
//----------------------------------------------------------------
``` mapDisplay1.SignpostBase=m_displayInfo_itemJane.AsItemOfInterest;

Moreover, a developer employing the framework can show the sun's orientation on a current map by setting a MapDisplay object, namely "ShowSunOrientation" 1308, in the following manner:

```
//----------------------------------------------------------------
// Display the sun
//----------------------------------------------------------------
``` mapDisplay1.ShowSunOrientation=true;

On an implementation level, when the MapDisplay object is asked to render a map, it chooses the best map (based on user or application developer specified criteria) from a set of available maps (e.g. indoor maps, outdoor maps, floor-plans, subway maps, street maps, other different kinds of maps). It then chooses the best resolution to use to render the map, and the best boundary areas of the map to ensure the most important items get displayed. When the right map as been selected, each of the Items (or Areas) of interest is attempted to be rendered onto this map image. If the Item or Area is found to be outside the bounds of the current map, but still relevant to the map, a "signpost" is rendered onto the map image indicating its relative distance and orientation to the designated item on the map.

To render this map, the direction vector drawn to it, and a compass icon the points in the direction of the object, vector mathematics are used to calculate the directional relationship between the SignpostBase object and the object whose signpost is being drawn. First a vector (v_direction) is calculated between the two objects. Second the "dot product" is calculated between this direction vector (v_direction) and the map's normalized North (v_north) and East (v_east) vectors (where the magnitude of both of these vectors should be the same, and the direction vector can be any magnitude. Thus, from this point, an x_component and a y_components can be determined relative to an object of reference (i.e. an anchoring point): x_component=v_direction*v_north; y_component=v_direction*v_east. From this, a compass heading is determined. Finally the signpost graphics and data are rendered onto the map image.

Furthermore, if a request is made that the sun's orientation is to be displayed on the map, this orientation is calculated by using the Universal Time (Greenwhich Mean Time) and the map objects Longitude and Latitude values. Based on these values, the correct position of the sun on the maps orientation can be determined.

Further flexibility is built into the system described above by: (a) allowing the providers of various maps to indicate whether their map knows which direction on their map corresponds to "Earth's North". If the map does not know where Earth's North is, no reference to the sun's orientation will be drawn; (b) allowing the providers of various maps to indicate their orientation to a "relative north" that may be used on local coordinate systems such as indoor coordinate systems that may not care about Earth orientation (e.g. some indoor location systems may not care where "true north" is).

Aspects of a Suitable Computing Environment

The signposting and orientation technology can be employed in various computing environments, which may be implemented inside the aforementioned mobile devices or outside such devices but working in cooperation with them. And, moreover, in software form, the technology can be stored on various media, not just computer readable media bearing computer executable instructions for use in a computing system.

Figure 14:
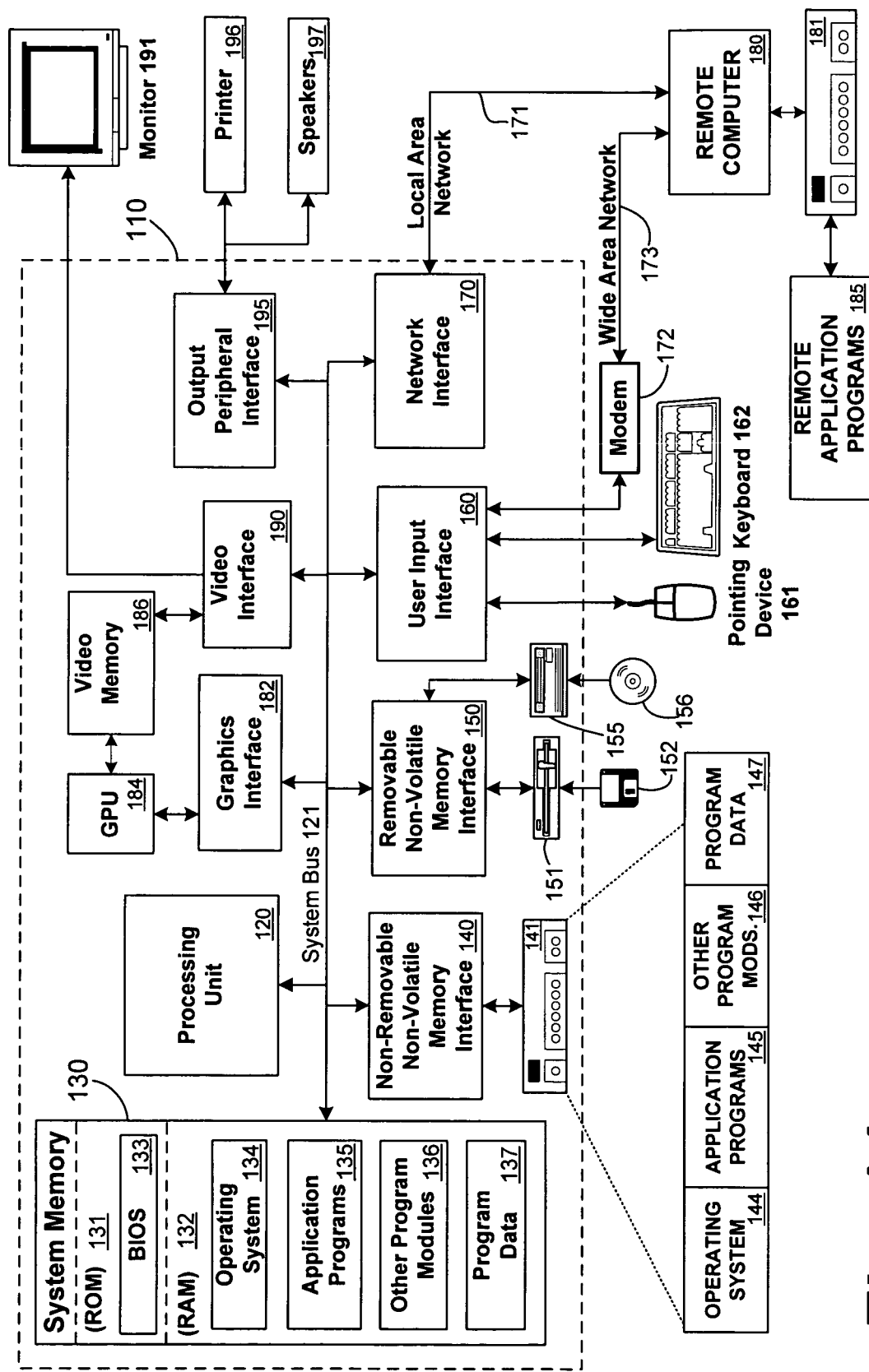
FIG. 14 illustrates an exemplary computing environment where aspects of the disclosed technology can be implemented.

FIG. 14 and the following discussion are intended to provide a brief general description of a suitable computing environment in connection with which the technology may be implemented. It should be understood, however, that handheld, portable and other computing devices and computing objects of all kinds are contemplated for use in connection with the present technology, i.e., anywhere where that it is desirable to flexibly, or quickly process data in a computing environment. While a general purpose computer is described below, this is but one example, and the present technology may be implemented with a thin client having network/bus interoperability and interaction. Thus, the present technology may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the techniques for downloading algorithmic elements to a coprocessor in accordance with the technology.

Although not required, the technology can be implemented via an operating system, for use by a developer of services for a device or object, and/or included within application software that operates in connection with the methods for coordinating wireless traffic in accordance with the technology. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the herein described technology may be practiced with other computer system configurations and protocols. Other well known computing systems, environments, and/or configurations that may be suitable for use with the technology include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers, and of course the above discussed mobile devices. The technology may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes, as described above.

FIG. 14 thus illustrates an example of a suitable computing system environment 100 in which the signposting and orientation technology may be implemented, although as made clear above, the computing system environment 100 is only one example of a suitable computing environment and is not intended to suggest any limitation as to the scope of use or functionality of the technology. Neither should the computing environment 100 be interpreted as having any dependency or requirement relating to any one or combination of components illustrated in the exemplary operating environment 100.

With reference to FIG. 14, an exemplary system for implementing the technology includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and/or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 14 illustrates operating system 134, application programs 135, other program modules 136, and program data 137.

The computer 110 may also include other removable/non-removable, volatile/nonvolatile computer storage media. By way of example only, FIG. 14 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150. All of these storage media are capable of storing the signposting and orientation instructions, but this is not an exclusive list.

The drives and their associated computer storage media discussed above and illustrated in FIG. 14 provide storage of computer readable instructions, data structures, program modules and other data for the computer 110. In FIG. 14, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they may be different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more coprocessors, such as graphics processing units (GPUs) 184, may communicate with graphics interface 182. In this regard, GPUs 184 generally include on-chip memory storage, such as register storage and GPUs 184 communicate with a video memory 186, wherein the methods for downloading algorithmic elements to a coprocessor of the technology have particular impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 14. The logical connections depicted in FIG. 14 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. Data communications device 172, such as a modem, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 14 illustrates remote application programs 185 as residing on memory device 181. It will be appreciated that the network connections shown are exemplary and other means of establishing a communications link between the computers may be used. All of these networked components may be implemented in using the signposting and orientation technology.

While the present disclosure has been described in connection with the preferred aspects, as illustrated in the various figures, it is understood that other similar aspects may be used or modifications and additions may be made to the described aspects for performing the same function of the present disclosure without deviating therefrom. For example, in one aspect of the disclosure, signposting and orientation technology was discussed. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A computer-implemented method for providing location and orientation information when displayed on a mobile device, comprising:

using a map in the mobile device;

displaying a viewed portion of the map in a display screen of the mobile device; and if an item on the map is outside the viewed portion of the map, then displaying a signpost for the item superimposed on the viewed portion of the map, wherein the item is anchored to an object of reference that is configured to change dynamically upon a request.

2. The computer-implemented method of claim 1, further comprising displaying an orientation mark, wherein the orientation mark is anchored to the object of reference.

3. The computer-implemented method of claim 1, wherein a vector appears between the object of reference and at least one of (a) the item and (b) an orientation mark.

4. The computer-implemented method of claim 2, wherein the orientation mark is a celestial body.

5. The computer-implemented method of claim 2, wherein the orientation mark is a grounded body.

6. The computer-implemented method of claim 1, wherein the map is any arbitrary map configured to be displayed in the mobile device obviating the need to be a pre-stored map of the mobile device.

7. The computer-implemented method of claim 1, wherein the signpost comprises a name of the item.

8. The computer-implemented method of claim 1, wherein the signpost comprises a distance between the item and the object of reference.

9. The computer-implemented method of claim 1, wherein the signpost comprises an orientation reference substantially corresponding to a direction from the object of reference to the item.

10. The computer-implemented method of claim 1, wherein at least one of (a) the item and (b) the object of reference is stationary on the map.

11. The computer-implemented method of claim 1, wherein at least one of (a) the item and (b) the object of reference is moving about the map.

12. The computer-implemented method of claim 1, wherein the request is made by a developer interacting with an application programming interface for building a location and orientation information application.

13. The computer-implemented method of claim 1, wherein the request is made by a user of the mobile device.

14. The computer-implemented method of claim 1, wherein at least one of (a) the object of reference and (b) the item is substantially in the center of the viewed portion of the map.

15. The computer-implemented method of claim 1, wherein at least one of (a) the object of reference and (b) the item is away from the center of the viewed portion of the map.

16. The computer-implemented method of claim 1, wherein the mobile device is a cell phone.

* * * * *